(12) United States Patent
Kim et al.

(10) Patent No.: US 6,661,682 B2
(45) Date of Patent: Dec. 9, 2003

(54) HIGH VOLTAGE GENERATING CHARGE PUMP CIRCUIT

(75) Inventors: Shi-Ho Kim, Taejou (KR); Jorgo Tsouhlarakis, Oud-Heverlee (BE)

(73) Assignee: IMEC (Interuniversitair Microelectronica Centrum), Leuven (BE)

(*) Notice: Subject to any disclaimer, the term of this patent is extended or adjusted under 35 U.S.C. 154(b) by 132 days.

(21) Appl. No.: 10/077,202

(22) Filed: Feb. 15, 2002

(65) Prior Publication Data

US 2002/0122324 A1 Sep. 5, 2002

Related U.S. Application Data

(60) Provisional application No. 60/269,567, filed on Feb. 16, 2001.

(51) Int. Cl.[7] .............................. G03F 3/02; G05F 1/10
(52) U.S. Cl. ........................... 363/59; 363/60; 307/110; 327/536
(58) Field of Search ..................... 363/59, 60; 307/110; 327/536, 537

(56) References Cited

U.S. PATENT DOCUMENTS

| | | | |
|---|---|---|---|
| 3,942,047 A | | 3/1976 | Buchanan |
| 5,180,928 A | * | 1/1993 | Choi .......................... 327/536 |
| 5,388,084 A | * | 2/1995 | Itoh et al. .................... 327/538 |
| 5,559,736 A | * | 9/1996 | Matsukawa et al. ... 365/185.14 |
| 5,886,566 A | | 3/1999 | Park et al. |
| 5,926,059 A | * | 7/1999 | Brani et al. .................. 307/110 |
| 5,986,947 A | | 11/1999 | Choi et al. |
| 6,163,487 A | * | 12/2000 | Ghilardelli .................. 327/536 |
| 6,420,926 B2 | * | 7/2002 | Lo Coco et al. ............ 327/536 |
| 6,437,636 B2 | * | 8/2002 | Zammattio et al. ......... 327/536 |

\* cited by examiner

*Primary Examiner*—Bao Q. Vu
(74) *Attorney, Agent, or Firm*—Jones Day

(57) ABSTRACT

The present invention is directed to a charge pump circuit. A multi-stage charge pump circuit with a particular structure for at least one of said stages is presented. The stage has two switches of which the second switch has a pair of conduction terminals connected between the first control terminal of the first switch and a next stage. The second switch, for instance a transistor, has a second control terminal, the second control terminal being connected to said previous stage. The present charge pump circuit is especially suited for use in an integrated memory device. No special last or output stage is required. Further, the circuit is suited for exploiting the floating well type technology, which is an advantage as the bulk effect is reduced by using such technology. In accordance with a second embodiment of the present invention, the choice of the steering signals (control and node clocks), possibly due to the selecting of the particular stage structure, is discussed. The selected structure results in less interclock constraints, more in particular in the vanishing of the node clocks constraint, enabling simpler clock design.

46 Claims, 13 Drawing Sheets

HIGH VOLTAGE GENERATING CHARGE PUMP CIRCUIT

CROSS REFERENCES TO RELATED APPLICATIONS

The present application is related to and claims priority from the following co-pending U.S. patent application:

U.S. Provisional Patent Application entitled "High Voltage Generating Charge Pump Circuit" having U.S. Patent Application No. 60/269,567 filed on Feb. 16, 2001, is currently pending. The above-identified application is incorporated by reference herein in its entirety.

BACKGROUND OF THE INVENTION

1. Field of the Invention

The present invention relates generally to semiconductor circuitry. More particularly, the present invention relates to a charge pump circuit usable in a semiconductor.

2. Description of Related Art

High voltage generators using charge pump circuits have been widely used in various semiconductor products. These high voltage generators are used for generating programming or erasing voltage for non-volatile memory having floating gate devices, such as EPROM, EEPROM, or Flash EEPROM. The high voltage generator may also be used for RAM devices such as DRAM, SRAM, or FeRAM in order to boost word line voltage.

FIG. 1(a) is the conventional charge pump circuit with four stages, disclosed in publication of IEEE Journal of Solid State Circuit, Vol. 11, pp. 374–378, June 1976, which is incorporated herein by reference in its entirety. Unit gain stage consists of NMOS switch(N1~N4) and pumping capacitor(C1~C4). The bulk of NMOSFETs are biased by constant voltage such as ground potential. Series connection of plurality of unit gain stage from node of supply voltage (Vdd) to output node forms the charge pump circuit. As shown in FIG. 1(b), input pulses of the charge pump, CLK1 and CLK2, should be non-overlapped pulses having the complementary phase. One drawback of the conventional circuit in FIG. 1(a) is that the gain is limited by an increment of the threshold voltage due to body effects. The gain of a stage is about Vdd−Vtn, where Vdd is the supply voltage and Vtn is the threshold voltage of a NMOSFET in the nth stage. Since the bulk potential is biased by constant voltage, the reverse biased voltage between source and bulk(VBS) is increased according to charge up of source node. Since the threshold voltage of nMOSFET is increased with VBS due to the body effects, the threshold voltage of NMOSFET is increased according to an increment of the output voltage. If the Vdd is lower than Vtn, the gain is zero. This circuit needs a pre-charge transistor(N0) between the node of Vdd and the first stage of pump. The pre-charge transistor between Vdd and the first stage is also caused by additional threshold voltage drop.

To overcome the limitations of the conventional charge pump, a variety of modified circuits have been reported in the relevant art. The approach to overcome the voltage loss due to threshold voltage drop is by boosting the gate voltage of pass transistors by incorporating additional gate boosting capacitors and charge-up transistors. The conventional charge pump circuit having a unit stage, which consists of two NMOSFETs and two capacitors is disclosed in the IEEE Journal of Solid State Circuit, Vol. 27, pp. 1540–1545, November, 1992, which is incorporated herein by reference in its entirety. FIG. 2(a) shows the conventional high voltage generator using two NMOS switches one for pass transistor (Np1~Np4) and the other for gate boosting transistor (NB1~Nb4) with gate boosting capacitor (CB1~CB4). The pump is controlled by four clock-pulses having two basic complementary phases with several non-overlapped timing margins.

FIG. 2(b) shows the control clocks for the conventional circuit of FIG. 2(a). The amplitude of the clocks is the same as the supply voltage (Vdd). CLK2 and CLK4 are inputs of gate capacitors, where the gate voltage boosted by these input-clocks controls the pass transistors to control whether these are ON or OFF. CLK1 and CLK3 are input pulses to pumping capacitors (CP1~CP4). In FIG. 2(b), the following timing margins are critical for proper operation. The duration of Tp2 and Tp4 is the time for turning on the pass transistor for transferring charge to the next stage. The margin of T14r, T14f, T23r, and T23f is inhibiting timing margin of turning on the pass transistors to prevent reverse charge flow from output to input direction. T13 is the timing margin for pre-charging gate boosting capacitors (CB1~CB4). The gate boosting capacitor is pre-charged when the gate voltage of the gate boosting transistor is high while the input clock of the gate boosting capacitor is low and the voltage of the input port is high (timing represented by T13 in the FIG. 2(b). When the input pulse of the gate boosting capacitor is high, the high level of the gate voltage becomes $$Vpc + \alpha * Vdd \quad (1)$$

where Vpc is a value of pre-charged voltage and α is the coupling coefficient between the gate boosting capacitor and the parasitic capacitance of the gate node of pass transistors. The value of α is obtained as:

$$\alpha = CB/(CB + Cparag), \quad (2)$$

where CB is the capacitance of the gate boosting capacitor and Cparag is the parasitic capacitance of the gate node of the pass transistors. The voltage over-drive of the gate node of the pass transistor upon the pre-charged level is about "α* Vdd." The peak level of charge pumping capacitor is:

$$Vpc + \beta * Vdd. \quad (3)$$

where β is the coupling coefficient between the charge pumping capacitor and the parasitic capacitance of the drain node of the pass transistors. The value of β is obtained as:

$$\beta = CP/(CP + Cparad), \quad (4)$$

where CP is the capacitance of the charge pumping capacitor and Cparad is the parasitic capacitance of the drain node of the pass transistors. The gate voltage of the pass transistor during charge transfer is maintained at a level about αVdd is higher than its pre-charged level.

The unit gain of stage n is about Vdd−Vtn, so the gain restriction is the same as the conventional circuit shown in FIG. 1(a), where Vtn is the threshold voltage of the pass transistor in the $n^{th}$ stage of the pump. This charge pump circuit can operate only when αVdd is larger than Vtn. The efficiency is improved compared to the conventional circuit in FIG. 1(a), but the efficiency is still very low.

The drawbacks of the conventional charge pump circuit depicted in FIG. 2(a) are as follows:

1) There is limitation of voltage gain due to body effects. Since NMOSFETs are biased by constant voltage, the threshold voltage is increased as the source voltage is increased.

2) The timing margins of T14f, T14r, T23r and T23f are required to prevent charge flow to reverse direction because the switch on the input side has to be in OFF state before the pumping pulse goes to the high state. The timing margin of T13 and T31, overlapping margins between two pulses, are also necessary to pre-charge the gate boosting capacitors. Therefore, net time for charge transferring operation is limited. And it is very difficult to operate the pump in the high frequencies.

3) High voltage is applied on the gate electrodes of the pass transistors. According to the Equation (1), the maximum voltage across the gate oxide is about $Vpc+\alpha*Vdd$ for transferring the voltage amount of "$Vpc+\beta*Vdd-Vthn$" to the capacitor of the next stage at the source side. As the MOS devices scaling down the dielectric thickness of gate oxide become thinner and thinner, the large voltage across the gate oxide may cause reliability problems such as dielectric breakdown, leakage current, and hot carrier effects, etc.

4) This charge pump circuit needs a termination switch between the end of the stage and the output node as represented by NP0 in FIG. 2(a). Since the output node has the highest potential among the circuits, the threshold voltage of this termination nNMOSFET is the most severe.

To overcome the threshold voltage drop due to the body effects of NMOS switches, a charge pump circuit with PMOSFETs on floating wells was disclosed in the U.S. Pat. No. 5,986,947, which is incorporated herein by reference in its entirety. FIG. 3 shows the conventional charge pump circuit using PMOSFETs. Unit stage comprises one pumping capacitor (CP1~CP4) and one PMOS switch (MP1~MPN) on floating wells. The input pulses shown in FIG. 1(a) can be used for this circuit. Since the wells are electrically floated, the potential of the well is changing with the source potential of pass transistors. There is no increment of reverse bias between the source and bulk of MOSFETs according to the increment of output voltages. Unit stage gain is approximately $Vdd-|Vth0|$, where $|Vth0|$ is an absolute value of threshold voltage without back bias. The conventional circuit has the following drawbacks:

1) The unit stage gain is "$Vdd-|Vth0|$." There is still gain loss due to the threshold voltage of the pass transistors. If Vdd is 1.0 volts and Vth0 is −0.5 volts, the unit gain is about 0.5 volts, so that more than twenty stages of pump are needed to generate 10 volts. The increased number of stages causes an increment of the rise time and decrement of the current driving capability.

2) As the pumping capacitor is charged up, the conductance of the PMOS pass transistors is decreased because of an increment of the gate voltage. So, the current derivability of the pump is self-limited during pre-charging operation. To compensate for the loss of conductance, the area of the pumping capacitor and the transfer transistor has to be increased.

3) This circuit needs a transfer switch for termination of the gain stage between the last stage and the output node of the pump. It causes an additional voltage drop and an increment of the rise time to steady the state of the high voltage generator.

SUMMARY OF THE INVENTION

In a first aspect of the present invention, a multi-stage charge pump circuit with a particular structure for at least one of the stages is presented. The stage has two switches of which the second switch has a pair of conduction terminals connected between the first control terminal of the first switch and a next stage. The second switch, for instance a transistor, has a second control terminal and the second control terminal is connected to the previous stage. The proposed charge pump circuit is especially suited for use in an integrated memory device. No special last or output stage is required. Further, the circuit is suited for exploiting the floating well-type technology, which is an advantage as the bulk effect is reduced by using such technology.

In a second aspect of the invention, the choice of the steering signals (control and node clocks), possibly due to the selecting of the particular stage structure, is discussed. The selected structure results in less interclock constraints, more in particular in the vanishing of the node clocks constraint, enabling simpler clock design.

BRIEF DESCRIPTION OF THE DRAWINGS

The novel features believed characteristic of the present invention are set forth in the appended claims. The invention itself, however, as well as a exemplary modes of use, further objectives and advantages thereof, will be best understood by reference to the following detailed description of an illustrative embodiment when read in conjunction with the accompanying drawings wherein:

FIG. 4(a) depicts two PMOSs on the floating wells, and both wells are electrically connected together in accordance with an exemplary embodiment of the present invention;

FIG. 4(b) depicts two PMOSs on the two floating wells that are electrically separated from each other in accordance with an exemplary embodiment of the present invention;

DETAILED DESCRIPTION OF THE INVENTION

Figure 4A:
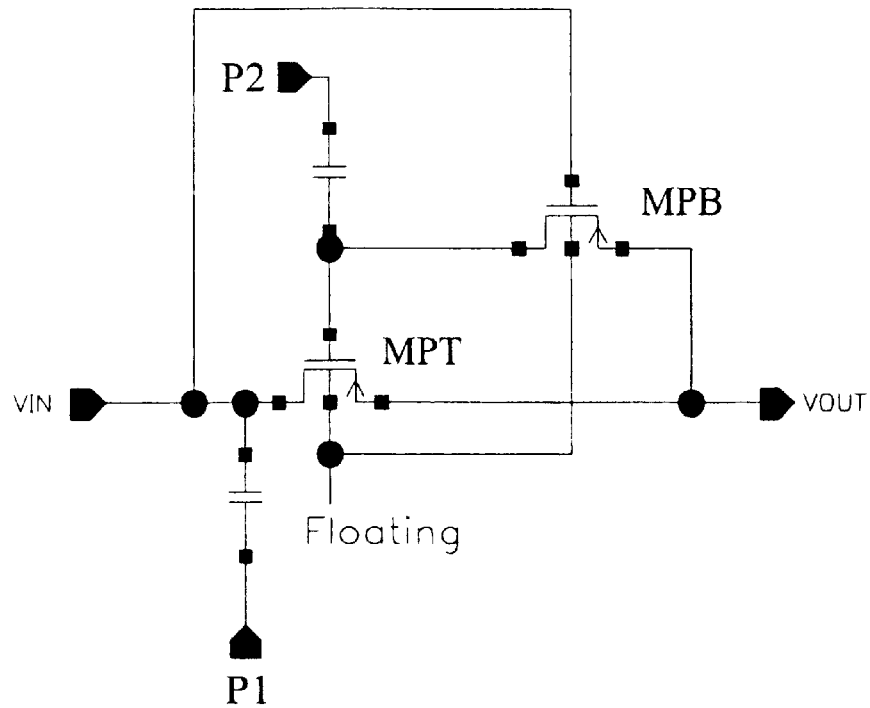
FIGS. 4(a) and 4(b) depict a unit stage of high voltage pump in accordance with an exemplary embodiment of the present invention.
Figure 4B:
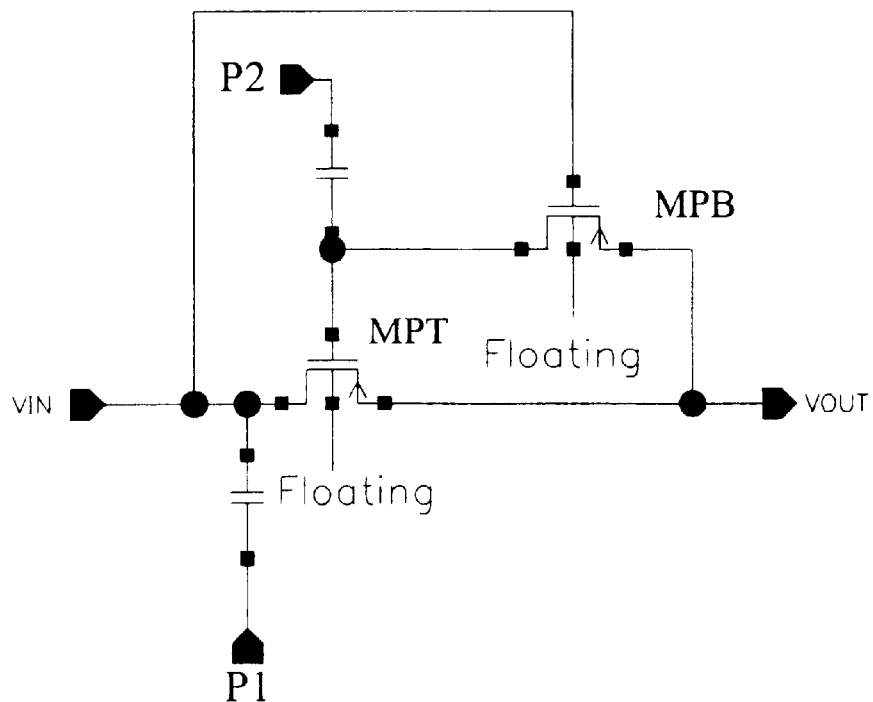

FIG. 4 shows a unit stage for a charge pump circuit in accordance with an exemplary embodiment of the present invention. The unit stage comprises a pair of PMOS transistors (MPT and MPB) and two capacitors (CP and CB). MPT is operated as a pass transistor for charge transfer and MPB is operated as a pre-charge transistor for CB. CP is a pumping capacitor, and CB is a capacitor for boosting the gate voltage of the pass transistor to negative direction. The wells of the PMOSFETs are electrically floated, and two floated wells can be connected together as shown in FIG. 4(a), or can be separated from each other, as shown in FIG. 4(b).

The charge pump has two basic phases of operation, one being pre-charging the capacitors and the other, transferring the charge of the pumping capacitor to the next stage through the pass transistor. When P1 is low in state, P2 is in high state, and MPT is turned OFF but MPB is in conducting condition. Then CP is pre-charged from the input node (VIN) to a level of Vcp. At this time, the level of CB is the same as the output node (VOUT).

In the next phase, when P1 becomes high and P2 is low, the charge stored in CP is transferred to the next stage.

During the charge transfer, the gate voltage of MPT decreases from the level before P2 went to low stage; the amount of voltage decreasing is about $-\alpha V_{pulse}$, where Vpulse is the amplitude of the input pulses.

The drain voltage of MPT increases to a level higher than the pre-charged level, and is approximated by:

$$V_{cp} + \beta V_{pulse} \quad (5)$$

where $\alpha$ is the coupling coefficient of CB and the parasitic capacitance at the gate node of MPT, and $\beta$ is the coupling coefficient of CP and the parasitic capacitance at the drain node of MPT. These are obtained by:

$$\alpha = CB/(CB + Cpara1) \quad (6)$$

and $$\beta CP/(CP + Cpara2) \quad (7)$$

Here, Cpara1 and Cpara2 are a summation of all parasitic capacitance of gate and drain of MPT, respectively. The voltage difference between the source and drain of MPT is about $(-\alpha^* V_{pulse})$. Hence, there is no threshold voltage drop by the pass transistor, MPT, during transfer. The voltage gain of the unit stage is $\beta^* V_{dd}$. The voltage gain of the unit stage is independent of the threshold voltage of the PMOS transistors until Vdd is higher than the threshold voltage of the PMOSFETs. The operational range of the pump is Vdd>|Vth0|, where Vth0 is the threshold voltage of the PMOSFET.

Figure 5:
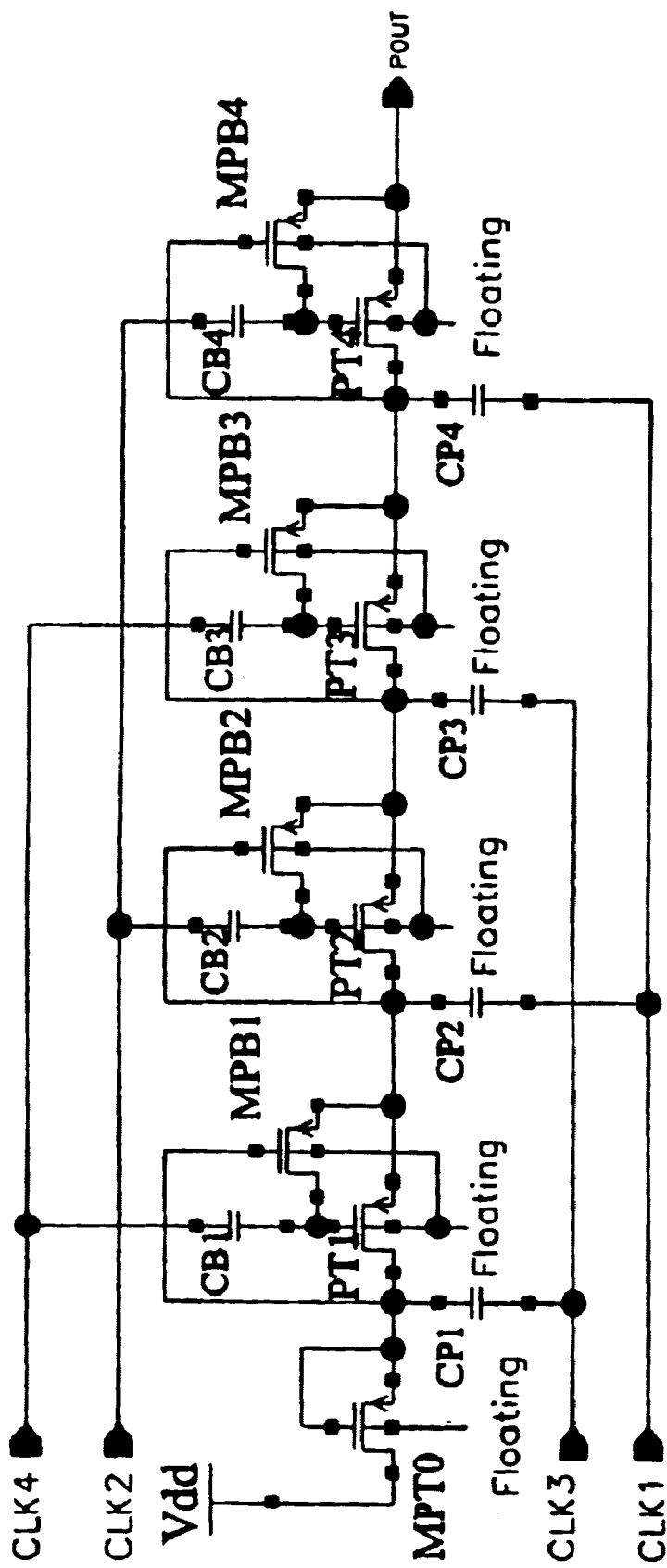
FIG. 5 is a diagram of a circuit in accordance with an exemplary embodiment of the present invention.

By cascading the unit stage of the pump, the required high voltage can be generated. FIG. 5 is a diagram depicting a circuit in accordance with an exemplary embodiment of the present invention. A plurality of the unit stages depicted in FIG. 4 is serially connected. Note that the wells of PMOSFETs in the unit stages can be connected or separated from each other, as shown in FIG. 4(a) or FIG. 4(b). In the drawings of FIG. 5, FIG. 7, FIG. 8 and FIG. 9, the schematic symbols of the connected wells are only to indicate that the wells are electrically floated, but are not intended to indicate that the wells are necessarily connected to each other.

Figure 6:
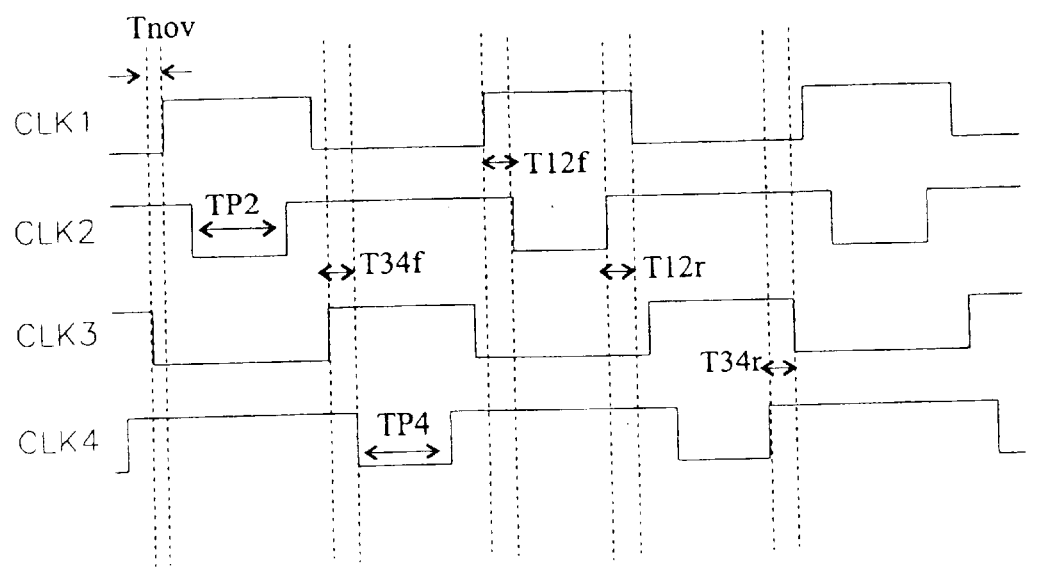
FIG. 6. is the input pulse of the high voltage generator of the present invention, where CLK1 and CLK3 are non-overlapped clocks in accordance with an exemplary embodiment of the present invention.

FIG. 6 is a diagram depicting the input pulse for the charge pump circuit in accordance with an exemplary embodiment of the present invention. In FIG. 6, the amplitude of the pulses is Vpulse. T12r is a timing margin that CLK2 should go high before CLK1 becomes low. Similarly, T34r is a timing margin for CLK4 which should go high before CLK3 becomes low. T12f is a margin for CLK2 that should remain in high state after CLK1 is transited from low to high state. T34f is a margin for CLK4 that should remain in high state after CLK1 transited from low to high state. Tnov is an inhibiting timing margin so that CLK1 and CLK3 are not overlapped in high phase. TP is a time for the charge transfer.

As explained in the operation of the unit stage of the pump in FIG. 4, the plurality of unit stages operates by using two complementary non-overlapped input clock pulses CLK1 and CLK3, to the pumping capacitors (CP1~CP4). The condition for turning on the pass transistor of a stage is that the input of the boosting capacitor should be low, while the input of the pumping capacitor is high. So, the input clock to the gate boosting capacitor (CB1~CB4), CLK2 and CLK4, has the same phase to CLK3 and CLK1 except for the margin at rising and falling edges, as shown in FIG. 6. The duration of TP2 or TP4 in the FIG. 6 represents this condition.

The operation of the pump is described below in the steady state because all parts of operation of the pump are implicit from their behavior in the steady state.

In the steady state, the potential of a pumping capacitor at input node changes from the pre-charged level (Vcp) to a high level (Vcp+βVpulse), in accordance with the phase changes of the input pulse from low to high state. If it is assumed that the coupling coefficient of all stages has the same value, and that there is no voltage loss by the pass transistor during charge transfer, the potential of a capacitor at the output node which is complement to the input, changes from pre-charged level (Vcp+βVpulse) to high level (Vcp+βVpulse+βVpulse) according to the input clock.

When the input node is low and the input pulse of gate boosting capacitor is high, the gate voltage of the pass transistor is in a high level of output node (Vcp+βVpulse+βVpulse). The next time, the clock in the output node goes low and the stage is operating in Tnov, then the gate voltage of the pass transistor is discharged to Vcp+βVpulse during Tnov. Then it will be going to (Vcp+βVpulse−αVpulse) after the input clock at the gate boosting capacitor becomes low. The voltage difference of the gate and source of the pass transistor is about (−αVpulse). So, if the magnitude of αVpulse is larger than the absolute value of the threshold voltage of the pass transistor, there is no voltage loss during transfer. Hence, the previous assumption is shown to be reasonable.

In order to prevent charge flow in reverse direction, the clock of the gate boosting capacitors must go to high before the clock of the pumping capacitor at input node is high. Therefore, timing margins T12r and T34r are needed. However, CLK2 can go to low before CLK1 goes to high, because it is not a condition for reverse charge flow. CLK4 can also go to low before CLK3 goes to high for the same reason. Therefore, the timing margins of T12f and T34f prevent reverse charge flow which is not necessary if CLK1 and CLK3 are non-overlapped clocks as shown in FIG. 6(b).

The above-described exemplary embodiment of the present invention has the following advantages:

1) There is no gain voltage loss due to the threshold voltage drop of pass transistors. The unit stage gain is $\beta$Vpulse, if $\alpha$Vpulse is larger than $|Vth0|$. Generally, Vpulse is the same as the supply voltage (Vdd), then unit stage gain is $\beta$Vdd. The value of $\beta$ is very close to 1 if the capacitance of the pumping capacitor is larger than the parasitic capacitance. One advantage of this invention is that if Vdd is 1.0 volts and Vth0 is −0.5 volts, approximately ten stages are needed to produce 10 volts. In the conventional pump circuit using floating well PMOS, twenty pumping stages are needed.
2) There are no body effects induced by threshold voltage increment nor gain voltage loss. The potential of floating wells follow the source potential of the PMOS, because source junction and N-type well form a junction diode. The well is slightly forwardly biased during the pumping operation. However, the well is electrically floated, the parasitic bipolar transistor is in OFF state; hence, there is no conduction dc current to the substrate.
3) If CLK1 and CLK3 are non-overlapped clocks to each other, then the timing margin of T12f and T34f is not necessary. The falling edge of CLK2 still has a margin of Tnov. Tnov is the non-overlapping time between CLK1 and CLK3.

Figure 1A:
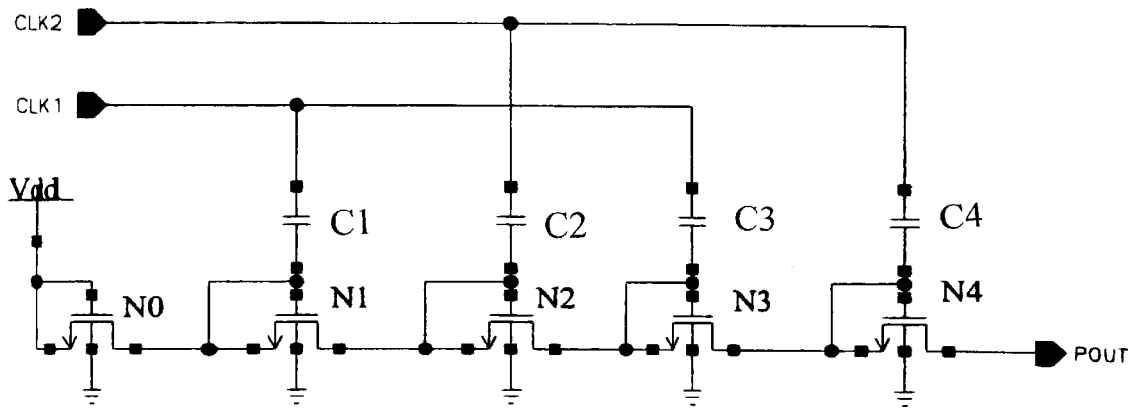
FIG. 1(a) is a conventional charge pump high voltage generator using NMOS switches.
Figure 1B:
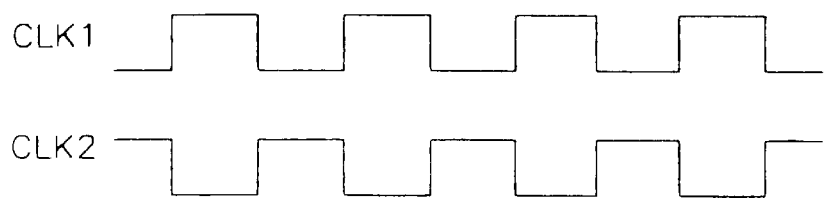
FIG. 1(b) is a timing diagram for the input pulses of conventional circuit shown in FIG. 1(a) and in FIG. 3.
Figure 2A:
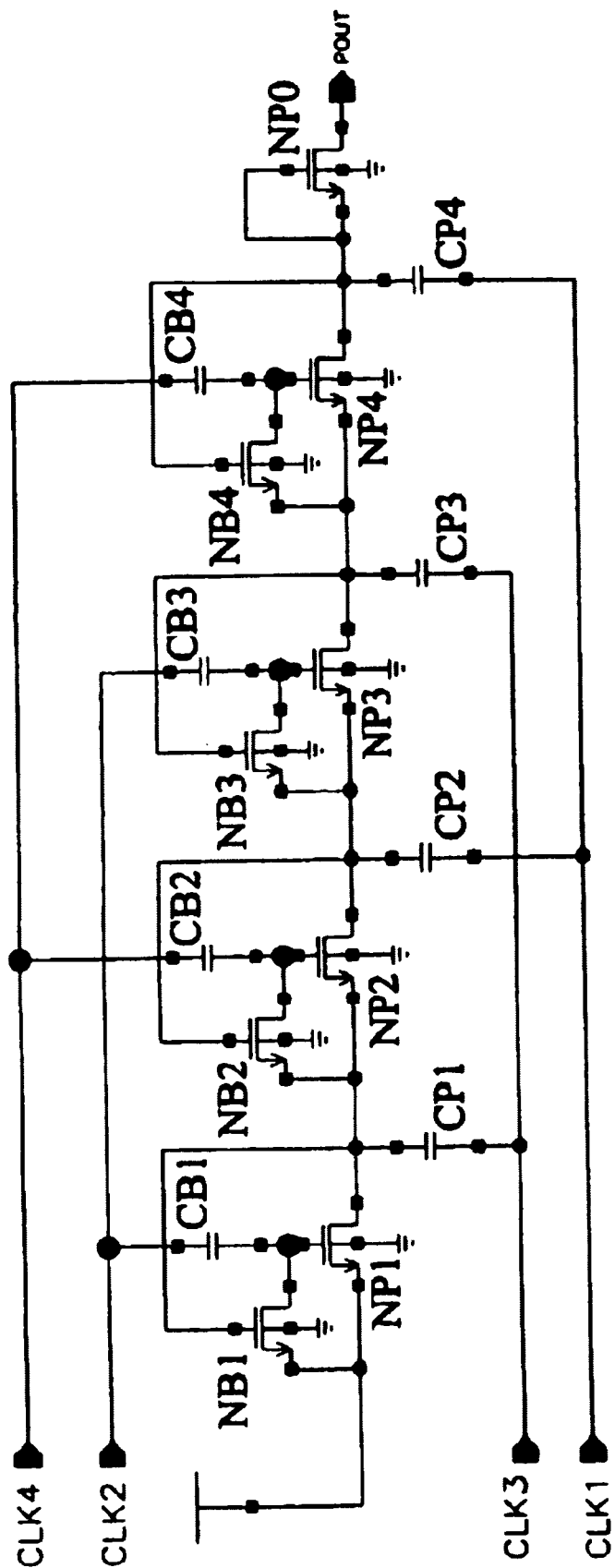
FIG. 2(a) is a conventional charge pump high voltage generator using NMOS switches having a bootstrapping capacitor on the gate node.
Figure 2B:
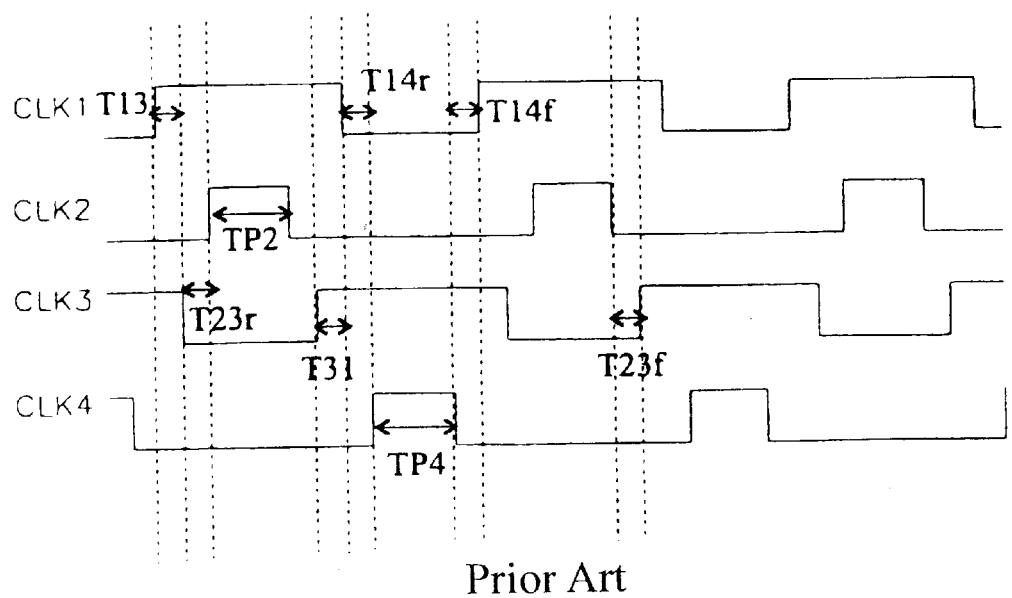
FIG. 2(b) is a timing diagram for the input pulses of the conventional circuit shown in FIG. 2(a)

This pump circuit can operate with higher frequency than the conventional NMOS circuit shown in FIG. 2. The value of both margins of T12f and T34f can be zero.
4) No additional termination circuitry at the end of the chain of stages is required, which would cause a big voltage loss, since the body effects of NMOSFET are most severe in the last stage.
5) The maximum voltage across the gate dielectric is less than in the conventional circuit. The pump circuits with NMOSs need to overdrive the gate voltage on the top of its pre-charge level of the input node. The maximum voltage across the gate dielectric is about Vcp+$\alpha$Vdd in the conventional circuit shown in FIG. 2. But, in the pump circuit, in accordance with an exemplary embodiment of the present invention with PMOSs on floating wells, the gate voltage is lowered from the pre-charge level to turn on the transistors. The potential of the well is about 0.7 volts lower than the highest voltage among the source or drain electrodes of PMOSFETs because the P-type drain and source form diode-junctions with floating wells. The maximum voltage across the gate oxide is about 2$\beta$Vpulse in the present invention. Therefore, the maximum voltage on the gate and bulk is smaller than NMOS switches. Since the dielectric thickness of the advanced MOS devices is very thin, the high voltage on the gate during operation may cause hot carrier-induced reliability problems such as breakdown, degradation of conductance, and gate leakage current.

Another Exemplary Embodiment of the Present Invention

Figure 7:
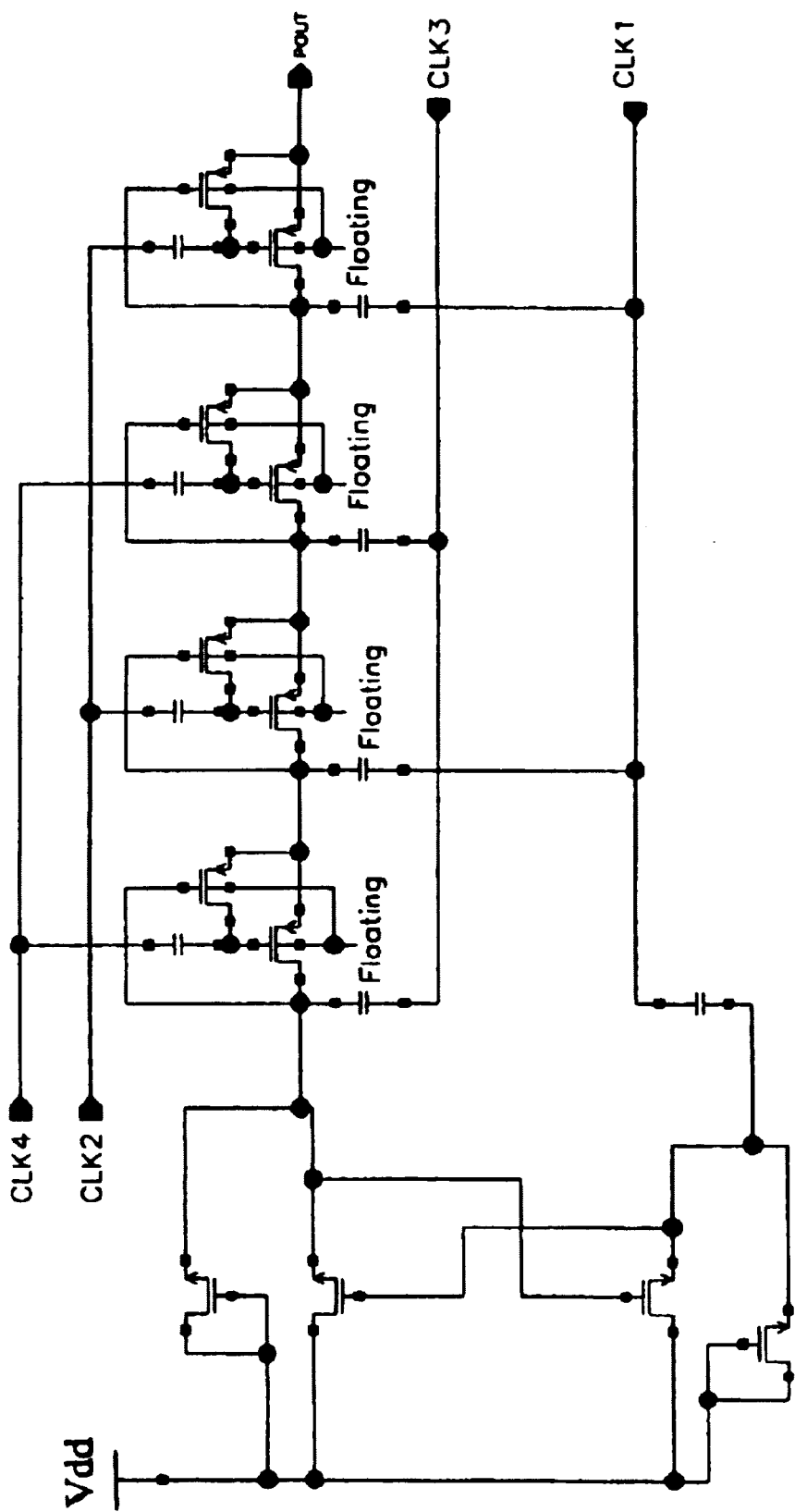
FIG. 7 is a diagram of a circuit in accordance with another exemplary embodiment of the present invention.

To prevent threshold voltage loss of transistors between the supply voltage (Vdd) and the first stage of pump, a gate boosted NMOS switch can be generated instead of the PMOSFET switch as shown in FIG. 7. The gate boosted NMOS switch was disclosed in the U.S. Pat. No. 3,942,047 and is incorporated herein by reference in its entirety. The charge pump circuit of this embodiment operates by using the same input clocks shown in FIG. 6. When the pulse of CLK3 or CLK1 is in high phase, the gate voltage of NP0t or NP0b become about Vdd+$\gamma$Vpulse. Where $\gamma$ is the coupling coefficient between the pumping capacitor and the summation of all parasitic capacitance of the gate node. Since Vdd+$\gamma$Vpluse is higher than the threshold voltage of NMOSFET, the pumping capacitor of the first stage can be charged to Vdd during the pre-charge phase. In addition to the advantages of the embodiment described above, this circuit has no voltage loss in the initial circuitry of the pump.

Another Exemplary Embodiment of the Present Invention

To program multiple cells, or to erase more than several kilobits of memory cells for multiple sectors erasing in Flash memories, high current capability is required from a high voltage generator. Therefore, it is necessary for the high voltage generator to generate both high voltage supply with current driving capability.

Figure 8:
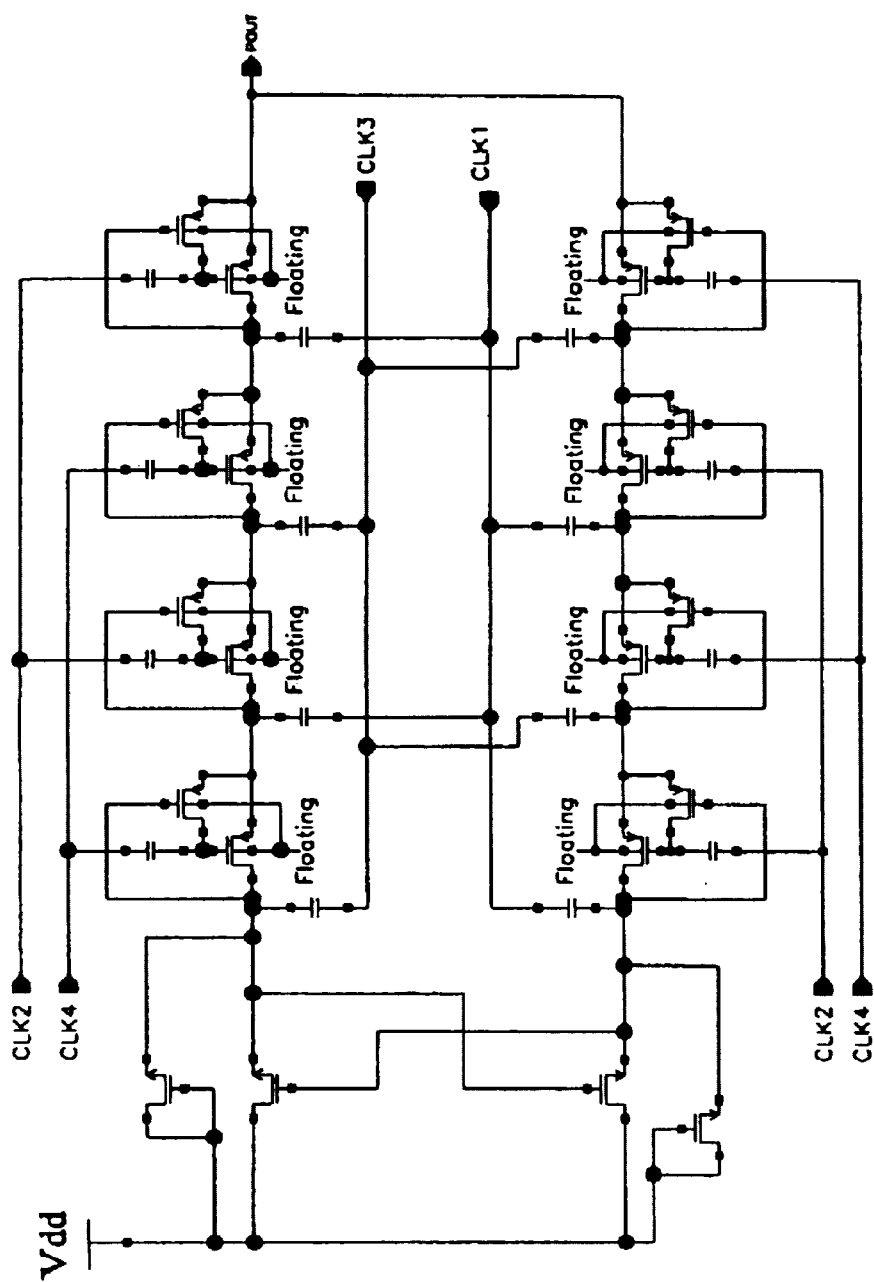
FIG. 8 is a diagram of a circuit in accordance with another exemplary embodiment of the present invention.
Figure 9:
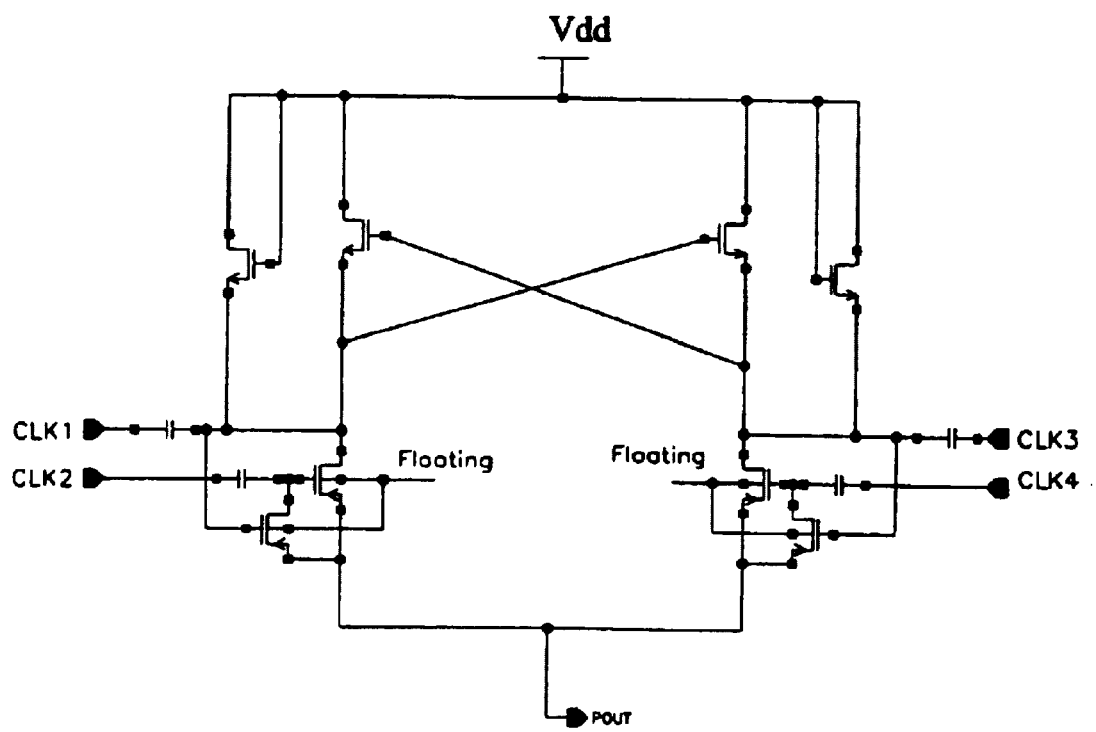
FIG. 9 is the implementation of voltage doubler using the switches in accordance with an exemplary embodiment of the present invention.

The positive high voltage generator using the charge pump circuit shown in FIG. 8 has a dual path of charge pumping stage. The current supply of the charge pump is twice as large as the single path charge pump consisting of the same size devices. The combination of two charge pump circuits operating in the opposite phase of input pulse forms a dual charge pump having dual paths. In accordance with an exemplary embodiment of the present invention described above, the same clock inputs can be used for operating this circuit. The above-described exemplary embodiment of the present invention has the following advantages:
1) The current driving capability of the charge pump circuit is double compared to the single path pump having the same size devices.
2) The advantage of the initially-described exemplary embodiment without any voltage loss in the initial circuitry of the pump.
3) By using this charge pump circuit, the DC Voltage doubler can be implemented which doubles the supply voltage. The dual-path charge pump circuit with single gain stage becomes a voltage doubler as shown in FIG. 9.

Clock Scheduling and Implementation of Input Clock Reshaping Circuit

Figure 11:
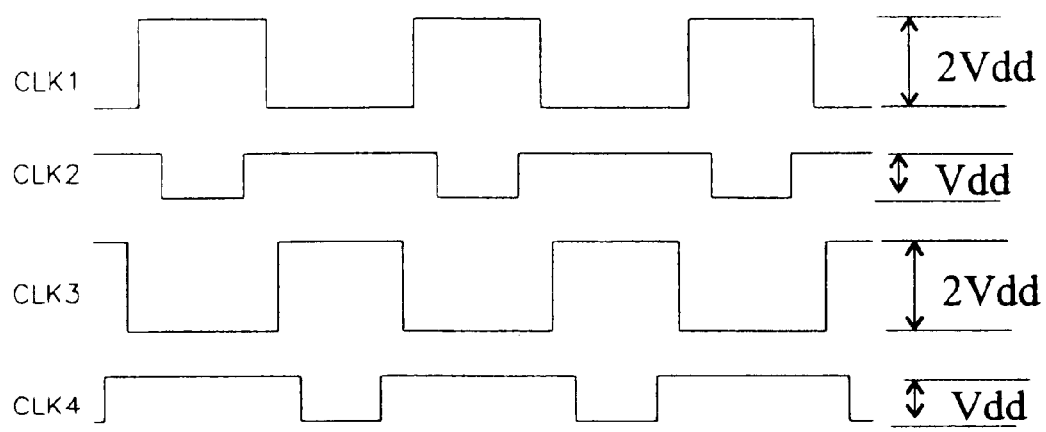
FIG. 11 are input pulses with boosted amplitude of pulses in accordance with an exemplary embodiment of the present invention.

In accordance with an exemplary embodiment of the present invention, FIG. 11 shows a circuit for generating an input pulse for the charge pump. The feedback circuit combined with NOR gate, time delay element and buffer delay reshapes the input pulse, OSCX, to two non-overlapping pulses, CLK1 and CLK3. The OSCX can be an arbitrary input pulse having a 50% duty ratio. The margin for non-overlapping between the two pulses, CLK1 and CLK3, is approximately equal to the total amount of delay time caused by delay element, buffer and NOR gate. A NAND gate is needed to generate an input pulse for gate boosting capacitors, CLK2 and CLK4. By NAND gating OSCX and CLK1, CLK2 can be generated, and similarly, CLK4 can be generated from OSCY and CLK3.

Usually, the amplitude of the operating pulse is the same as Vdd level. But, by boosting the amplitude of the input clocks, the efficiency of gain can be improved. Since the voltage difference of the gate and source (Vgs) of a pass transistor is about −$\alpha$Vpulse during transferring phase, conductance of the pass transistor is greatly improved if the gate clock is boosted from Vdd level to a higher voltage. On the other hand, boosting input pulses of pumping capacitors improves both conductance and voltage gain of the pump. Note that the gain of a unit stage is calculated as $\beta$Vpulse. Since a circuitry for boosting the clocks may consume some power, it would be a better choice to boost only the input clock pulse of pumping capacitors, instead of boosting all inputs, if the power efficiency of the pump is considered.

Figure 12:
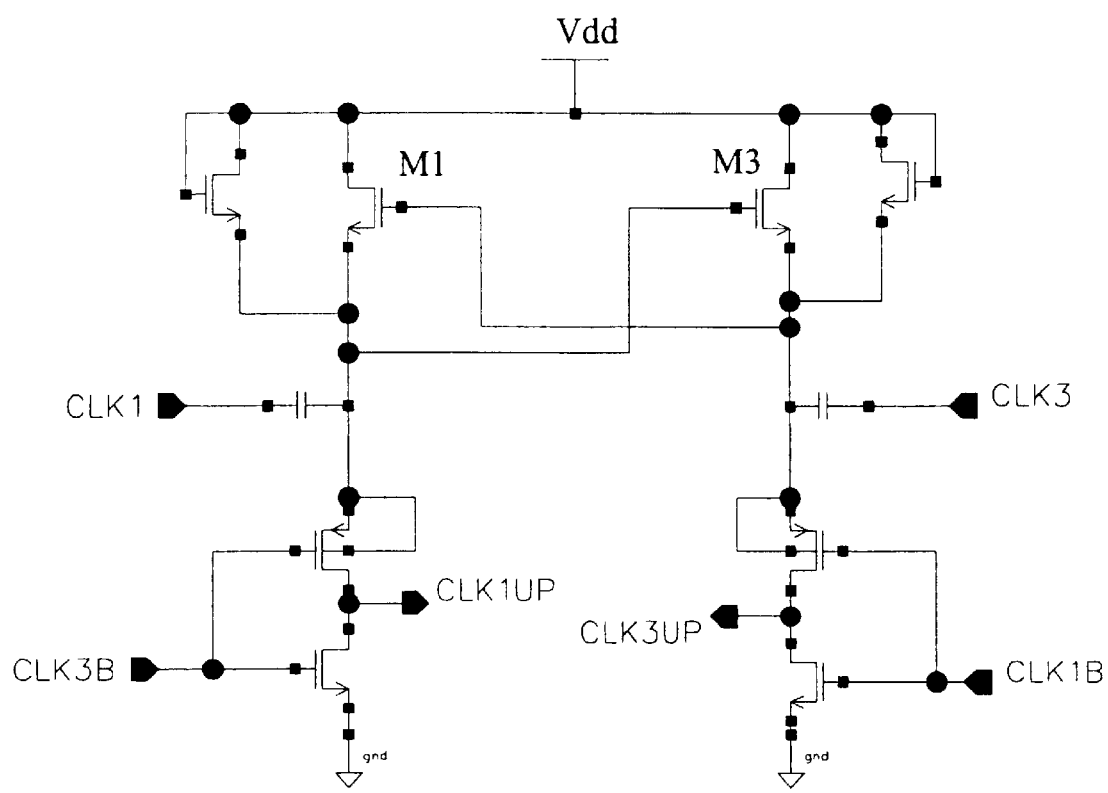
FIG. 12 is an example of a boosted clock generator in accordance with an exemplary embodiment of the present invention.

FIG. 11 shows an input pulse having different amplitude between the gate boosting capacitor input and the pumping capacitor input. FIG. 12 shows a boosted clock generator, which doubles the input clock amplitude. The cross coupling of the boosting stage consists of M1 and M3 generator pulses having the amplitude of 2Vdd. The control inputs, CLK1, CLK3, CLK3B and CLK1B can be the pulses from the circuit shown in FIG. 10.

Since the maximum voltage across the gate dielectric is less than in the conventional circuit, the invented circuit has the benefit of reliability when the charge pump circuit operates by using the boosted clock input.

Figure 10:
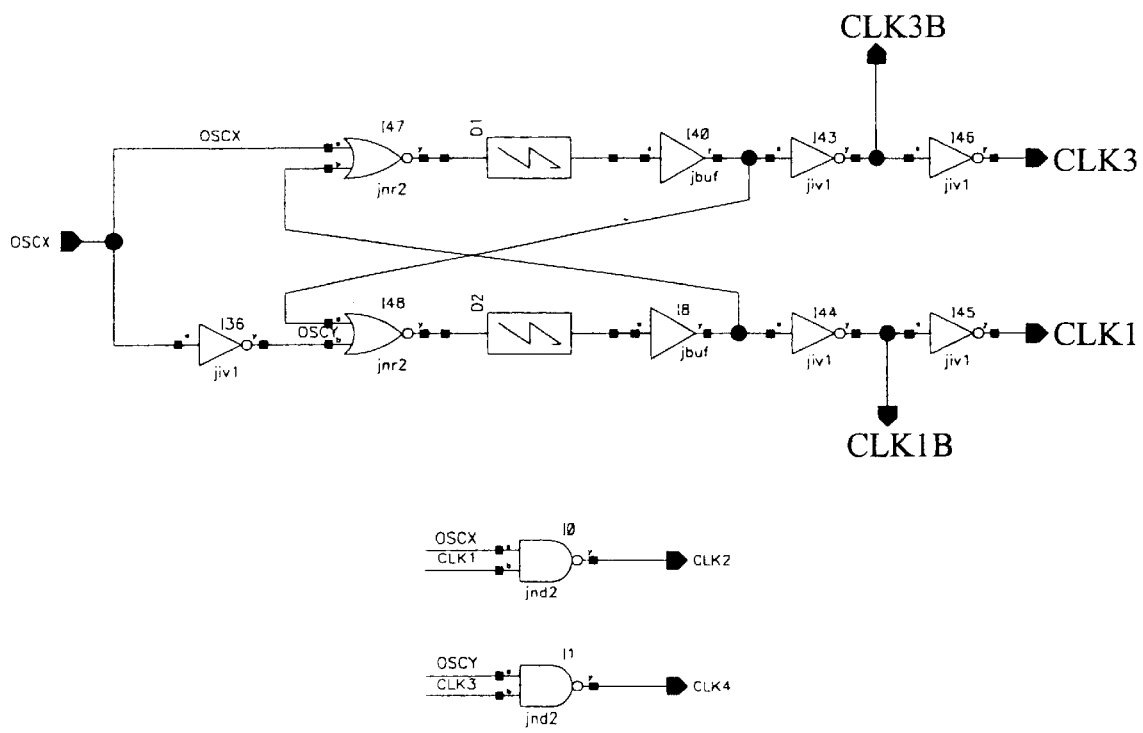
FIG. 10 is an example of an input pulse generator in accordance with an exemplary embodiment of the present invention.

The exemplary circuit embodiment depicted in FIG. 10 and FIG. 12 is an example of a clock reshape circuit, which one of ordinary skill in the art would readily understand that the circuit for this purpose could be easily modified. Therefore, the present invention is not restricted by the scope of the exemplary circuit embodiment depicted in FIG. 10 or FIG. 12.

Timing Aspects of the Steering Clocks

One aspect of the invented PMOS boosting circuit is that the scheduling of the four clocks needed for steering the operation of said circuit has less interclock constraints when compared to scheduling, which is necessary for prior art NMOS boosting circuits.

First, an analysis of interclock constraints for said prior art NMOS boosting circuit is presented.

Within multi-stage circuits one can identify the relations previous, current and next between stages. The clocks used for steering the operation of such circuits can also be classified as either clocks for controlling a boosting capacitor, abbreviated for this discussion, as control clock, or clocks for leveraging (increase voltage) of nodes in between stages, abbreviated for this discussion as node clock.

Typically, the control clocks have a so-called duty cycle of less than 50%, meaning that for the NMOS type circuit, on average, the control clocks are on less time than they are off.

A first constraint between node clocks and control clocks exists because, before leveraging a node (related clock going from OFF to ON) between a previous and a current stage, the previous stage must be turned OFF.

Figure 3:
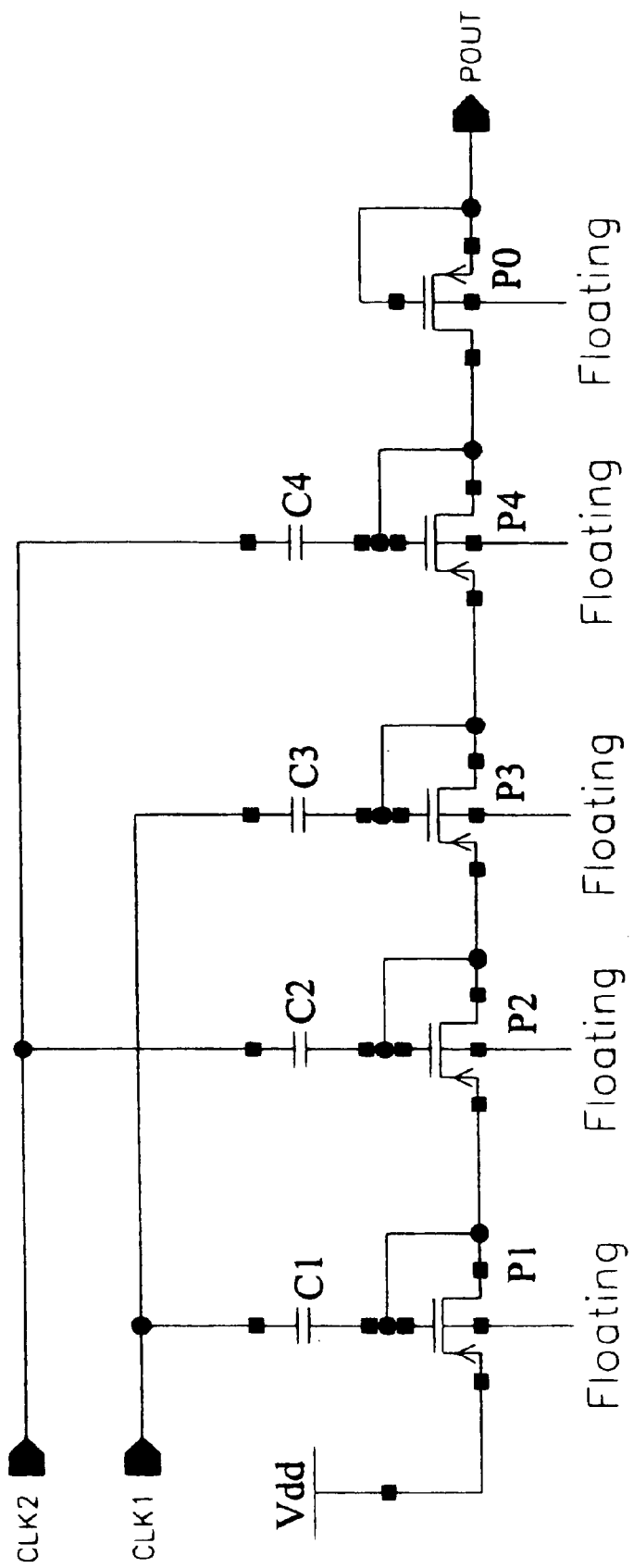
FIG. 3 is a conventional charge pump high voltage generator using PMOS switches on electrically floated wells.

By way of example and with references to FIG. 2, the previous stage is defined by transistors NP2, and NB2 and the current stage are defined by transistors NP3, and then NB3, the leveraging node between the stages, is controlled by clock CL1 and the previous stage is controlled by clock CL4. Hence, the first constraint specifies that clock CL4 must go down 'before' clock CL1 rises. The same relationship applies for clock CL2 and clock CL3. These constraints are indicated as T14f and T23f, respectively, in FIG. 3.

A second constraint, a complement of the first constraint, is again between control and node clocks. Before turning on a current stage, the node between said current stage and the next stage must be lowered.

Referring again to FIG. 2, the current stage is defined by transistors NP2, NB2 and the next stage defined by transistors NP3, NB3 the leveraging node in between is controlled by clock CL1 and the current stage is controlled by clock CL4. Hence, the second constraint specifies that clock CL1 must go down 'before' clock CL4 rises. The same relationship applies for clock CL2 and clock CL3. These constraints are indicated as T14r and T23r, respectively, in FIG. 3.

Note that said first and second constraints can be considered as safety margins because precise clocking is difficult to obtain.

A third constraint exists between node clocks because, before leveraging the node between a previous and a current stage, the pre-charging capacitor of the current stage must be pre-charged.

With reference to FIG. 2, the previous stage is defined by transistors NP1 and NB1 and the current stage is defined by transistors NP2 and NB2, then the leveraging node between the stages is controlled by clock CL3 and the pre-charging capacitor of the current stage is controlled by the node between the current and next stage and connected to clock CL1. Hence, the third constraint specifies that clock CL1 must remain high 'before' clock CL3 rises. Also, the reverse clock CL 3 must remain high 'before' clock CL1 rises must be fulfilled. These constraints are indicated as T31 and T13, respectively, in FIG. 3.

One advantage of the invented PMOS boosting circuit is that less interclock constraints are needed.

The duty cycle requirement for the invented PMOS type circuit implies that the control clocks are, on average, on less time than off.

Similar constraints such as the first and second constraint described earlier for the NMOS circuit presented remain.

A first constraint exists between node clocks and control clocks because, before turning on the next stage, the node between the current and next stage must be leveraged.

In the exemplary circuit shown in FIG. 5, the current stage is defined by transistors PT2 and MPB2, and the next stage is defined by transistors PT3 and MPB3, then the leveraging node between the stages is controlled by clock CL3 and the next stage is controlled by clock CL4. Hence, the first constraint specifies that clock CL3 must go up before clock CL4 goes down (note, opposite than for NMOS). The same relationship applies for clock CL2 and clock CL1. This is indicated by T34f and T12f, respectively, in FIG. 6.

The second constraint, a complement of the first constraint, is again between the control and node clocks. Before lowering the node between a previous and current stage, said current stage must be turned OFF.

In the exemplary circuit depicted in FIG. 5, the previous stage is defined by transistors PT2 and MPB2, and the current stage is defined by transistors PT3 and MPB3, then the leveraging node between the stages is controlled by clock CL3 and the current stage is controlled by clock CL4. Hence, the second constraint specifies that clock CL4 must go up (note opposite than for NMOS) 'before' clock CL3 goes down. The same relationship applies for clock CL2 and clock CL1 which is indicated by T34r and T12r, respectively, in FIG. 6.

Due to the layout difference, the third constraint on pre-charging does not result in a constraint between node clocks CL1 and CL3 as the pre-charging of the pre-charging capacitor is done now by the leveraging node itself.

Therefore, clock CL1 does not need to remain high 'before' clock CL3 rises and similarly, clock CL 3 does not need to remain high 'before' clock CL1 rises. Thus, clock CL3 goes down slightly before clock CL1 goes up and the other way around, which is advantageous for operating the device.

The node clocks (CL1, CL3) can thus be more OFF than ON in the case of FIGS. 5 and 6, while the opposite condition is true in FIG. 2.

The corresponding structures, materials, acts, and equivalents of all means or step plus function elements in the claims below are intended to include any structure, material, or act for performing the function in combination with other claimed elements as specifically claimed. The description of the exemplary embodiments of the present invention has been presented for purposes of illustration and description, but is not intended to be exhaustive or limited to the invention in the form disclosed. Many modifications and variations will be apparent to those of ordinary skill in the art. The exemplary embodiments were chosen and described in order to best explain the principles of the invention and the practical application, and to enable others of ordinary skill in the art to understand the invention for various embodiments with various modifications as are suited to the particular use contemplated.

What is claimed is:

1. A charge pump circuit comprising:
   a plurality of stages cascade connected between an input and an output terminal, said plurality of stages comprising at least one basic stage, comprising:
      a first switch having a pair of conduction terminals connected between a previous stage and a next stage, and said first switch having a first control terminal receiving a first drive signal;
      a second switch having a pair of conduction terminals connected between said first control terminal and a next stage; and
      a boost capacitor connected to the conduction terminals of said first switch, connecting said switch with a previous stage.

2. The charge pump circuit according to claim 1, wherein said switches are transistors.

3. The charge pump circuit according to claim 2, wherein said first transistor comprises a P-channel MOSFET.

4. The charge pump circuit according to claim 2, wherein said second transistor comprises a P-channel MOSFET.

5. The charge pump circuit according to claim 1, wherein said second switch having a second control terminal, receiving a second drive signal, said second control terminal being connected to said previous stage.

6. The charge pump circuit according to claim 1, wherein said boost capacitor has one terminal connected to an interconnection node between adjacent connected stages, and another terminal receiving a phase signal, and wherein boost capacitors of said adjacent connected stages receive phase signals having an opposing phase.

7. The charge pump circuit according to claim 1, wherein boost capacitors of odd-numbered stages are driven by a first common phase signal.

8. The charge pump circuit according to claim 1, wherein boost capacitors of even-numbered stages are driven by a second common phase signal.

9. The charge pump circuit according to claim 1, wherein said basic stage comprising:
   a second pre-charging capacitor, one terminal of said second pre-charging capacitor being connected to said first control terminal, and another terminal of said second pre-charging capacitor being connected to a phase signal.

10. The charge pump according to claim 9, wherein pre-charging capacitor adjacent connected stages receive phase signals having an opposing phase.

11. The charge pump circuit according to claim 10, wherein pre-charging capacitors of odd-numbered stages have a common third phase signal.

12. The charge pump circuit according to claim 10, wherein pre-charging capacitors of even-numbered stages have a common fourth phase signal.

13. The charge pump circuit according to claim 2, wherein body terminals of said transistors are floating.

14. The charge pump circuit according to claim 2, wherein body terminals of said transistors are connected to each other.

15. The charge pump circuit according to claim 1 further comprises a first stage comprising a PMOS transistor with floating body terminal.

16. A memory device comprising:
   a plurality of cells; and
   a charge pump circuit providing a pumped voltage to said plurality of cells, said charge pump circuit comprising:
      a plurality of stages cascade connected between an input and an output terminal, said plurality of stages comprising at least one basic stage, comprising:
         a first switch having a pair of conduction terminals connected between a previous stage and a next stage, said first switch having a first control terminal receiving a first drive signal;
         a second switch having a pair of conduction terminals connected between said first control terminal and a next stage; and
         a boost capacitor connected to the conduction terminals of said first switch, connecting said switch with a previous stage.

17. The memory device according to claim 16, wherein said switches are transistors.

18. The memory device according to claim 17, wherein said first transistor comprises a P-channel MOSFET.

19. The memory device according to claim 17, wherein said second transistor comprises a P-channel MOSFET.

20. The memory device according to claim 17, wherein said second transistor or switch having a second control terminal, receiving a second drive signal, said second control terminal being connected to said previous stage.

21. The memory device according to claim 16, wherein said boost capacitor has one terminal connected to an interconnection node between adjacent connected stages, and another terminal receiving a phase signal, and wherein boost capacitors of said adjacent connected stages receive phase signals having an opposing phase.

22. The memory device according to claim 16, wherein boost capacitors of odd-numbered stages driven by a first common phase signal.

23. The memory device according to claim 16, wherein boost capacitors of even-numbered stages driven by a second common phase signal.

24. The memory device according to claim 16, wherein said basic stage comprises:
   a second pre-charging capacitor, one terminal of said second pre-charging capacitor being connected to said first control terminal, and another terminal of said second pre-charging capacitor being connected to a phase signal.

25. The memory device according to claim 24, wherein pre-charging capacitor adjacent connected stages receive phase signals having an opposing phase.

26. The memory device according to claim 25, wherein pre-charging capacitors of odd-numbered stages have a common third phase signal.

27. The memory device according to claim 26, wherein pre-charging capacitors of even-numbered stages have a common fourth phase signal.

28. The memory device according to claim 17, wherein body terminals of said transistors are floating.

29. The memory device according to claim 17, wherein body terminals of said transistors are connected to each other.

30. The memory device according to claim 16, wherein said charge pump circuit further comprises a first stage comprising a PMOS transistor with floating body terminal.

31. A method for generating a voltage greater than a supply voltage in an integrated memory device provided with a single supply voltage using a charge pump circuit a charge pump circuit having a plurality of stages cascade connected between an input and an output terminal, said plurality of stages comprising at least one basic stage, said at least one basic stage comprising a first switch having a pair of conduction terminals connected between a previous stage and a next stage and having a first control terminal receiving a first drive signal, a second switch having a pair of conduction terminals connected between said first control terminal and a next stage, and a boost capacitor connected to the conduction terminals of said first switch, connecting said switch with a previous stage, the method comprising:

applying phase signals to the control terminal of said capacitors for passing a voltage through each stage from the input terminal to the output terminal so that the voltage passed by each stage is cumulatively increased by an amount equal to a reference voltage.

32. The method recited in claim 31, wherein said switches are transistors.

33. The method recited in claim 32, wherein said first transistor comprises a P-channel MOSFET.

34. The method recited in claim 33, wherein said second transistor comprises a P-channel MOSFET.

35. The method recited in claim 32, wherein said second switch having a second control terminal, receiving a second drive signal, said second control terminal being connected to said previous stage.

36. The method recited in claim 32, wherein said boost capacitor has one terminal connected to an interconnection node between adjacent connected stages, and another terminal receiving a phase signal; and wherein boost capacitors of said adjacent connected stages receive phase signals having an opposing phase.

37. The method recited in claim 32, wherein boost capacitors of odd-numbered stages driven by a first common phase signal.

38. The method recited in claim 32, wherein boost capacitors of even-numbered stages driven by a second common phase signal.

39. The method recited in claim 32, wherein said basic stage comprises:

a second pre-charging capacitor, one terminal of said second pre-charging capacitor being connected to said first control terminal, and another terminal of said second pre-charging capacitor being connected to a phase signal.

40. The method recited in claim 39, wherein pre-charging capacitor adjacent connected stages receive phase signals having an opposing phase.

41. The method recited in claim 40, wherein pre-charging capacitors of odd-numbered stages have a common third phase signal.

42. The method recited in claim 41, wherein pre-charging capacitors of even-numbered stages have a common fourth phase signal.

43. The method recited in claim 33, wherein body terminals of said transistors are floating.

44. The method recited in claim 33, wherein body terminals of said transistors are connected to each other.

45. The method recited in claim 32, wherein said charge pump circuit further comprises a first stage comprising a PMOS transistor with floating body terminal.

46. The method recited in claim 32, wherein said phase signals comprise:

a first common phase signal connected to said boost capacitors of odd-numbered stages;

a second common phase signal connected to said boost capacitors of even-numbered stages;

a third common phase signal connected to said pre-charging capacitors of odd-numbered stages; and a fourth common phase signal connected to said pre-charging capacitors of even-numbered stages;

wherein said phase signals being characterized in that:
said phase signals having two voltage levels, being a high and low voltage level;
said first and second phase signal being equal up to a 180-degree phase shift;
said third and fourth phase signal being equal up to a 180-degree phase shift; and
said first and second phase signal being more on the low voltage level than the high voltage level.

* * * * *